June 18, 1957 — J. B. ERMILIO — 2,795,852
TAILOR'S MEASURING DEVICE
Filed Nov. 17, 1955 — 2 Sheets-Sheet 1

INVENTOR.
JOHN B. ERMILIO
BY
Harry Langram
ATTORNEY

June 18, 1957     J. B. ERMILIO     2,795,852
TAILOR'S MEASURING DEVICE
Filed Nov. 17, 1955     2 Sheets-Sheet 2
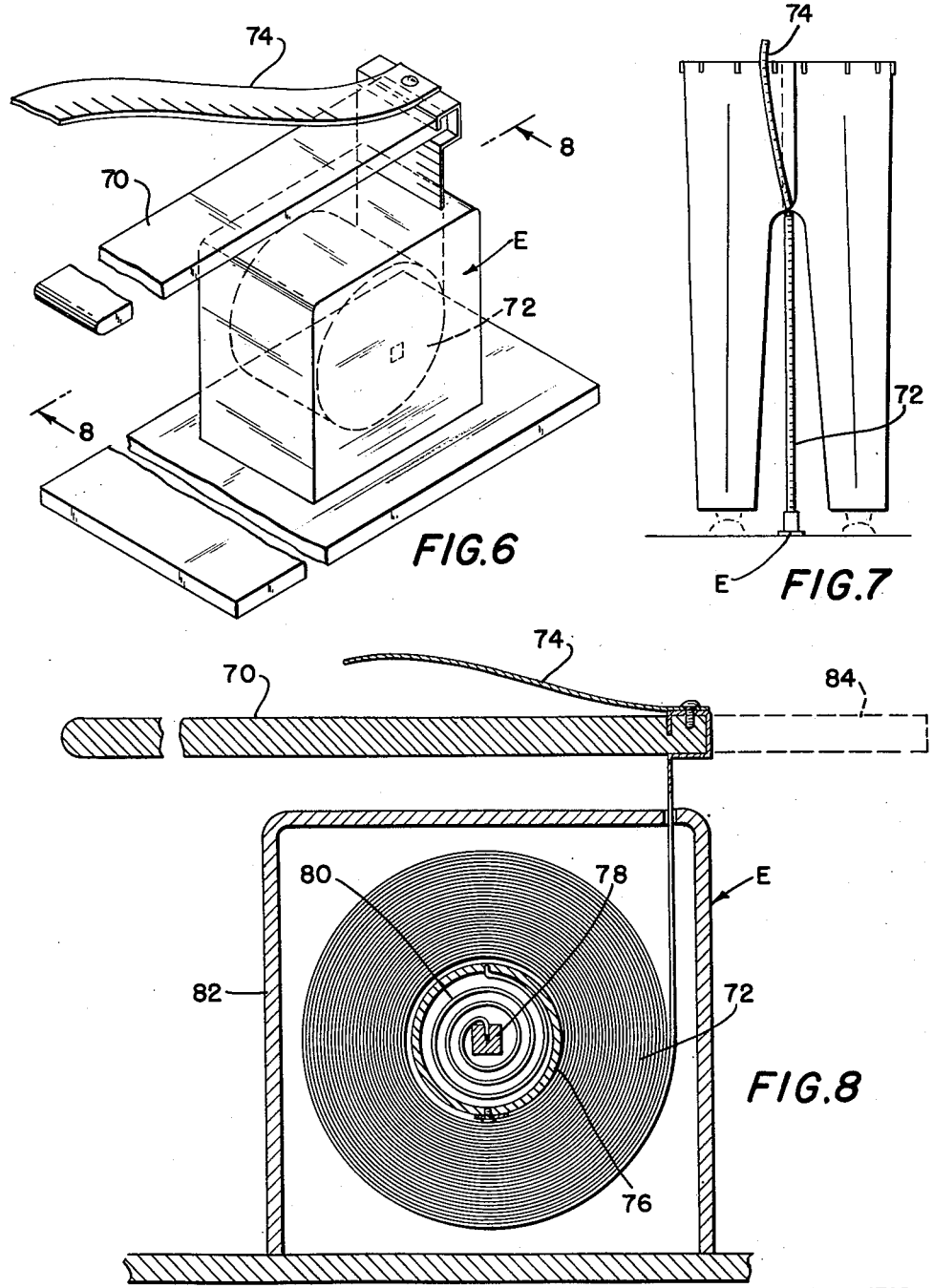
INVENTOR.
JOHN B. ERMILIO
BY
*Harry Sangram*
ATTORNEY

United States Patent Office 2,795,852
Patented June 18, 1957

2,795,852

TAILOR'S MEASURING DEVICE

John B. Ermilio, Philadelphia, Pa.

Application November 17, 1955, Serial No. 547,393

1 Claim. (Cl. 33—3)

My invention relates to a device for measuring garments, and more particularly relates to a multiple purpose measuring device which is capable of taking all of the necessary measurements for fitting a garment to a person's body.

Heretofore, in taking the measurements of a person's body for the fitting of a garment, it was frequently necessary for the wearer to be in an awkward position which was different from the normal wearing position. In addition, the tailor or fitter who was taking the measurements generally used an unsupported flexible tape and, therefore, was also required to be in an uncomfortable position for certain of these measurements. As a consequence, many inaccuracies arose during the fitting procedure and considerable time was lost in the fitting alone.

It, therefore, is an object of my invention to provide a device for accurately fitting a garment upon a wearer wherein both the wearer and fitter are in a normal and comfortable position.

Another object of my invention is to provide a multiple purpose measuring device capable of taking all of the necessary measurements for fitting a suit, dress, trousers, skirt, or blouse upon a person.

Another object of my invention is to provide a device for accurately fitting a garment upon a person which will compensate for errors in the judgment of that person as to "feel."

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings, in which:

Fig. 6 is an auxiliary device which is used to measure the length and seat of trousers.

Fig. 7 is a view showing the auxiliary trouser device being applied to the seat of the trousers.

Fig. 8 is a vertical sectional view taken along lines 8—8 of Fig. 6.

Figure 2:
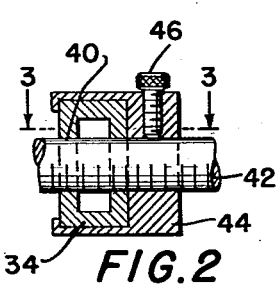
Fig. 2 is a vertical sectional view taken along lines 2—2 of Fig. 1.

Referring now in greater detail to the drawings, in which similar reference characters refer to similar parts, I show a tailor's measuring device comprising a vertical reference section, generally designated as A, a neck section, generally designated as B, a shoulder and chest section, generally designated as C, a waist and nether section, generally designated as D, and a trouser section, generally designated as E.

The vertical reference section A establishes a vertical plane to which all horizontal measurements of a person may be related, and comprises a pair of tubular uprights 12 mounted within a bracket 14. An upper cap 16 maintains a constant separation of the tubular uprights 12 along their entire length and prevents the tubes from twisting with respect to one another. The vertical reference section A is mounted upon a flat platform 18 and is secured thereto by a pair of wing nuts 20 fastened upon bolts 22, the bolts being affixed to the platform 18 and passing through the bracket 14. It is to be noted that the tubes 12 are calibrated throughout their length from a reference position beginning at the top of the platform 18.

Figure 1:
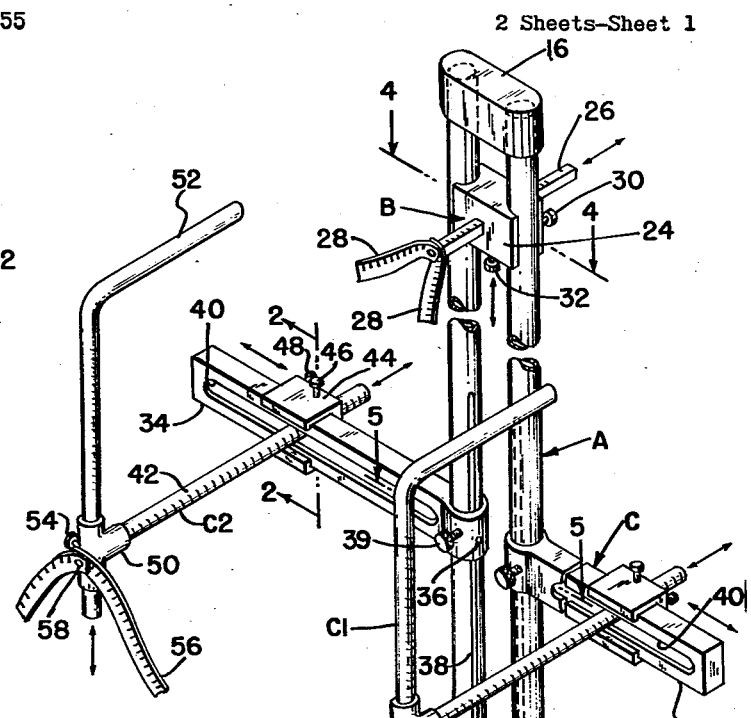
Fig. 1 is a perspective view of a tailor's measuring device embodying my invention.
Figure 4:
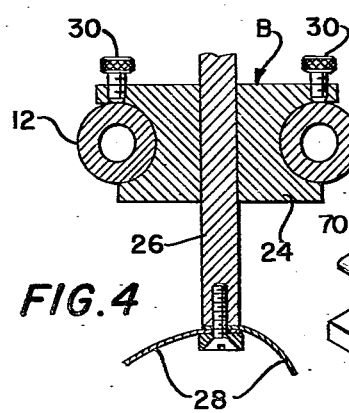
Fig. 4 is a horizontal sectional view taken along lines 4—4 of Fig. 1.

The neck section B comprises a vertically sliding bracket 24 in which a calibrated bar 26 is horizontally positioned and slidably supported. A pair of flexible tapes 28 are pivotally mounted at the forward end of the bar 26 and are adapted to encircle a person's neck. As is seen from Figs. 1 and 4, the bracket 24 is contoured at its ends to slidably interfit between the tubes 12 and may be maintained in any fixed vertical position thereon by a pair of thumb screws 30. A vertically located thumb screw 32 maintains the position of the horizontally extending bar 26, as desired.

Figure 5:
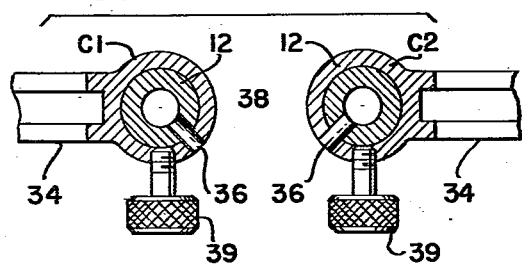
Fig. 5 is a horizontal sectional view taken along lines 5—5 of Fig. 1.

The shoulder and chest section C consists of a left portion C1 and a right portion C2, each portion comprising a bracket 34 slidably supported upon a tube 12. The two brackets are set at opposite directions to one another 180° apart. The bracket movement is restricted within the same vertical plane as the vertical reference section A by a pin 36 pressed into each bracket, each pin slidably engaging a vertically extending slot 38 in the tubes 12 (see Fig. 5).

Figure 3:
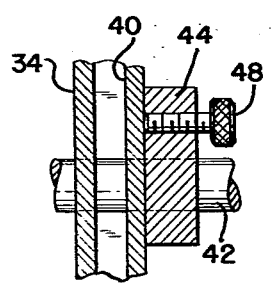
Fig. 3 is a horizontal sectional view taken along lines 3—3 of Fig. 2.

Each of the brackets 34 has a longitudinally extending channel 40 in which a horizontal rod 42 is slidably mounted at right angles to the plane of the bracket movement. The horizontal rod 42 has longitudinal calibrations thereon and the rod is also axially supported within a block 44. As is easily seen from Figs. 1, 2, and 3, the axial position of the rod 42 may be fixed at any time by a thumb screw 46 and the lateral position of the rod 42 may be set in place along the brackets 34 by tightening thumb screw 48. A T-fitting 50 is secured to the forward end of the rod 42 and an L-shaped rod 52 is slidably mounted within the throughway of the T-fitting. It is to be noted that the throughway is maintained in a vertical position parallel with that of the tubes 12. The vertical arm of the L-shaped rod 52 is calibrated and a fixed vertical position may be maintained at any time by tightening thumb screw 54 passing through the T-shaped fitting 50. A pair of flexible tapes 56 are pivotally mounted at 58 to the T-shaped fitting 50.

The waist and nether section D is of identical construction and mounting as the neck section A, and comprises a vertical sliding bracket 60 in which a calibrated bar 62 is horizontally and slidably positioned. A pair of flexible tapes 64 are pivotally mounted at the forward end of the bar 62 and are adapted to encircle a person's hips, waist, thighs, and therebelow. The bracket 60 is contoured at its ends to slidably interfit between the tubes 12 and may be maintained in any fixed vertical position thereon by thumb screws 66. The horizontal extended position of the bar 62 may be positively fixed by tightening thumb screw 68.

The trouser section E comprises a staff 70, one end of which is affixed to a steel tape 72. A flexible fitter's tape 74 is pivotally mounted to the upper edge of the staff 70. At the same end as that to which the steel tape 72 is affixed, the steel tape 72 is attached to and rolled about a drum 76 which is resiliently mounted upon a fixed shaft 78 by a coil spring 80. The shaft 78 does not rotate and is secured to a box 82 whereby the drum 76 will be turned in a counter-clockwise direction as the steel tape 72 is pulled upwardly, as is seen in Fig. 8, the coil spring 80 tightens when the steel tape 72 is drawn and thus the coil spring tension enables automatic return of the tape.

It is to be noted that the trouser section E may be used in connection with the vertical reference section A by inserting the extension 84 within the slot normally occupied by the horizontal bar 62 in the bracket 60. While using the trouser section E in connection with the stand provides rigidity and accuracy of measurement, the section E can also be used independently so long as the measurements are taken with the staff 70 horizontal.

As is readily apparent from the foregoing description, my measuring device works as follows: In order to establish the general spinal contour of the customer, he stands upon the platform 18 with his heels abutting the front edge of the bracket 14. While in a normal standing posture, his back is permitted to touch the vertical reference section A at whatever portions of his posterior conform thereto.

The bar 26 of the neck section B is pushed forward at his neck position until it just touches his neck and the bar reading is taken to determine neck height and forward incline. The two tapes 28 encircle the neck to the front collar button position and determine collar full-size and half-size in the event abnormal twisting of the neck is evident.

The shoulder and chest portions C1 and C2 are adjusted with one rod 42 under an armpit and a chest breadth measurement taken by the separation between the two bars. Shoulder stoop is measured by the horizontal distance along each rod 42 where the vertical portion of the L-shaped rod 52 touches the front portion of the shoulders. Shoulder slope is measured along the vertical portions of the L-shaped rods 52 along a plane passing through the horizontal portion of the L-shaped rods where they touch the upper portion of the shoulders. The tapes 56 measure arm lengths, diameter, and quarter-breast measurements.

Waist height and girth and hip girth are established by waist section D. It is to be noted that all girth measurements are taken from a center point in back to a center point in front. Since most people have different half-sizes, with two tapes 64 pivotally mounted, a perfect half-size is obtained. This applies to all half-size measurements which may be taken with each pair of tapes 28, 56, and 64.

In order to take trouser length and seat measurements, the customer stands as shown in Fig. 7, and the trouser section E is drawn up until the staff 70 in a horizontal position touches the crotch. The center of the steel tape roll is positioned at a compensated height above the floor so that the bottom of the trouser cuff will be at its normal position. The fitter takes the measurement to the crotch and can ask the customer if a "short" trouser leg or a cuff "break" is desired and ¼ inch may be added or subtracted from the trouser leg length respectively. With the staff 70 retained in the same position, the tailor's tape 74 is drawn about the seat of the customer and a reading is taken to the waist position. The waist position is established prior thereto by vertical shifting of the waist section D.

Although my invention has been described in considerable detail, such description is intended as being illustrative rather than limiting, since the invention may be variously embodied.

I claim as my invention:

A tailor's measuring device comprising a vertical reference section, a neck section, a shoulder and chest section, a waist and nether section, and a trouser section, said vertical section comprising a pair of tubes affixed in a vertical plane to a platform, said neck section having a bracket slidably mounted upon said pair of tubes, a horizontal slidable calibrated bar mounted within said bracket and a pair of pivotally mounted tapes affixed to said calibrated bar, said shoulder and chest section comprising a pair of vertical slidable brackets on said tubes, each of said brackets being 180° apart and being adapted to slide within the same vertical plane as said vertical reference section, a calibrated rod horizontally slidably within a slot in said bracket and being adapted to extend horizontal and at right angles to the vertical plane of said brackets, a L-shaped calibrated rod vertically positioned and slidably mounted within a T-shaped fitting at the end of each of said calibrated rods, and a pair of pivotally mounted tubes at the end of each of said calibrated rods, said waist and nether section comprising a bracket slidably mounted upon said pair of tubes, a horizontally slidable calibrated bar mounted within said bracket and a pair of pivotally mounted tapes affixed to said calibrated bar, and said trouser section comprising a horizontal staff adapted to interfit within said waist and nether bracket, a steel tape affixed to one end of said staff and spring mounted upon a drum, and a flexible tape mounted upon the same end of said staff as said steel tape.

References Cited in the file of this patent
UNITED STATES PATENTS

| | | |
|---|---|---|
| 826,651 | D'Elia | July 24, 1906 |
| 872,705 | Moritz | Oct. 11, 1910 |
| 1,053,323 | Skrell | Feb. 18, 1913 |
| 2,052,099 | Lytton | Aug. 25, 1936 |
| 2,664,633 | Reich | Jan. 5, 1954 |